US012699355B2

(12) United States Patent (10) Patent No.: US 12,699,355 B2
Di Luna et al. (45) Date of Patent: Aug. 4, 2026

(54) VERSATILE HOROLOGY COMPONENT

(71) Applicant: ROLEX SA, Geneva (CH)

(72) Inventors: Pierre Di Luna, Geneva (CH); Ollivier Pujol, Lausanne (CH); Alexandra Roulet, Geneva (CH)

(73) Assignee: ROLEX SA, Geneva (CH)

( * ) Notice: Subject to any disclaimer, the term of this patent is extended or adjusted under 35 U.S.C. 154(b) by 1070 days.

(21) Appl. No.: 16/448,962

(22) Filed: Jun. 21, 2019

(65) Prior Publication Data

US 2019/0391534 A1 Dec. 26, 2019

(30) Foreign Application Priority Data

Jun. 25, 2018 (EP) ...................................... 18179672

(51) Int. Cl.
*G04B 19/32* (2006.01)
*C04B 35/44* (2006.01)
(Continued)

(52) U.S. Cl.
CPC .............. *G04B 19/32* (2013.01); *C04B 35/44* (2013.01); *C04B 35/447* (2013.01);
(Continued)

(58) Field of Classification Search
CPC .................................................... G04B 19/32
See application file for complete search history.

(56) References Cited

U.S. PATENT DOCUMENTS 4,205,522 A 6/1980 Takami
6,512,721 B1 * 1/2003 Amano ................. H05B 33/02
368/227
(Continued)

FOREIGN PATENT DOCUMENTS

CH 713 156 A2 5/2018
EP 2 626 401 A1 8/2013
(Continued)

OTHER PUBLICATIONS

European Search Report and Written Opinion dated Nov. 29, 2018 issued in counterpart application No. EP18179672; w/ English machine translation (26 pages).
(Continued)

*Primary Examiner* — Edwin A. Leon
*Assistant Examiner* — Jason M Collins
(74) *Attorney, Agent, or Firm* — WHDA, LLP

(57) ABSTRACT

A horology component (1) for a timepiece, wherein the component includes a first portion (10) and a second portion (20), the first portion (10) including a part that is made from at least one opaque material at least partially superposed on top of the second portion (20), this second portion (20) including a material capable of emitting at least one emission light wave if excited by at least one excitation light wave, and the part of the first portion (10) including structuring (13) allowing an emission light wave emitted by the second portion (20) to be transmitted at least partially toward the outside of the horology component so that the horology component exhibits at least a first appearance by day and at least one different second appearance by night where the first portion (10) is backlit by an emission light wave emitted by the second portion (20).

20 Claims, 5 Drawing Sheets

(51) Int. Cl.

| | | |
|---|---|---|
| *C04B 35/447* | (2006.01) | |
| *C04B 35/48* | (2006.01) | |
| *G04B 19/10* | (2006.01) | |
| *G04B 19/12* | (2006.01) | |

(52) U.S. Cl.
CPC ............ *C04B 35/481* (2013.01); *G04B 19/10* (2013.01); *G04B 19/12* (2013.01)

(56) References Cited

U.S. PATENT DOCUMENTS

| | | | |
|---|---|---|---|
| 9,284,485 | B2 | 3/2016 | Berner et al. |
| 9,394,480 | B2 | 7/2016 | Berner et al. |
| 9,920,245 | B2 | 3/2018 | Berner et al. |
| 10,196,566 | B2 | 2/2019 | Berner et al. |
| 2003/0007425 | A1 | 1/2003 | Amano et al. |
| 2004/0196742 | A1 | 10/2004 | Gouthier et al. |
| 2007/0210282 | A1* | 9/2007 | Kubel ................ C09K 11/7792 |
| | | | 252/301.4 F |

| | | | |
|---|---|---|---|
| 2008/0159083 | A1* | 7/2008 | Kawakami ............. G04B 19/12 |
| | | | 368/232 |
| 2013/0207040 | A1 | 8/2013 | Berner et al. |
| 2014/0124702 | A1 | 5/2014 | Berner et al. |
| 2015/0252260 | A1 | 9/2015 | Berner et al. |
| 2016/0137919 | A1 | 5/2016 | Berner et al. |

FOREIGN PATENT DOCUMENTS

| | | | |
|---|---|---|---|
| EP | 2 730 636 | A1 | 5/2014 |
| JP | H07-55958 | A | 3/1995 |

OTHER PUBLICATIONS

European Search Report and Written Opinion dated Nov. 29, 2018 issued in application No. EP18179674, counterpart of co-pending U.S. Appl. No. 16/448,971; w/ English machine translation (24 pages).

* cited by examiner

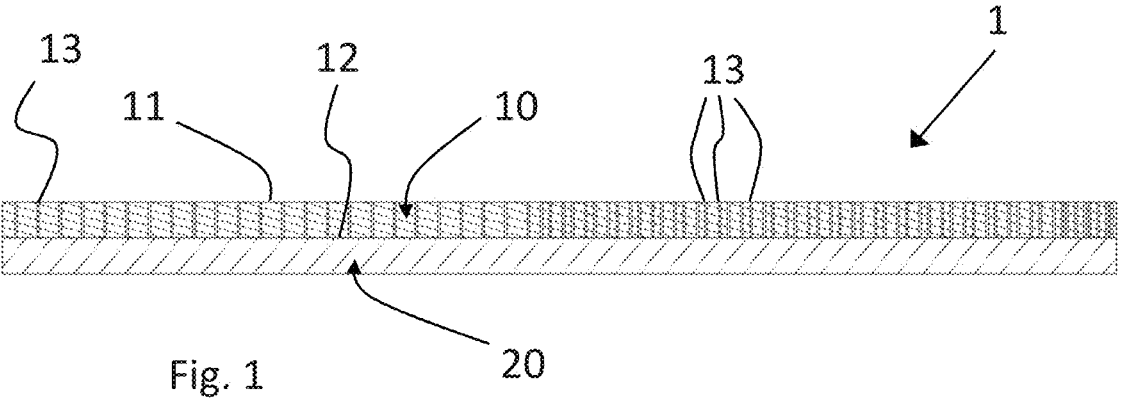
Fig. 1
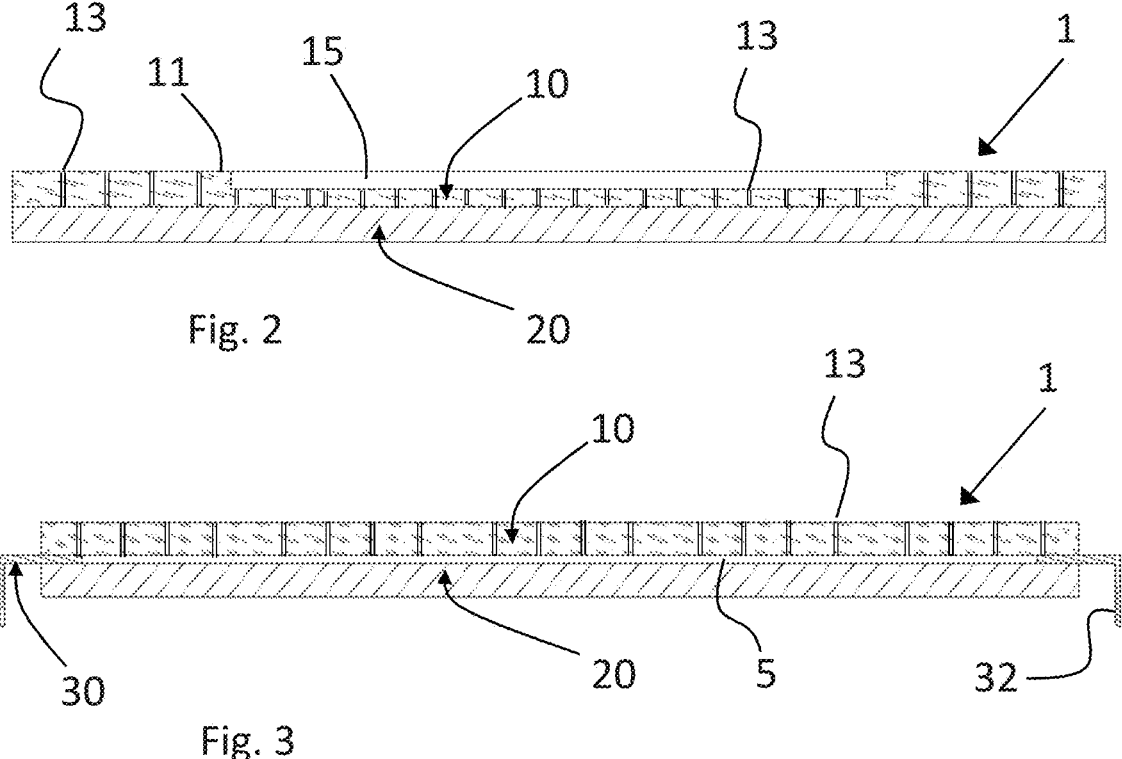
Fig. 2
Fig. 3

VERSATILE HOROLOGY COMPONENT

This application claims priority of European patent application No. EP18179672.3 filed Jun. 25, 2018, the content of which is hereby incorporated by reference herein in its entirety.

INTRODUCTION

The present invention relates to a versatile horology component. This horology component may be a dial, a dial counter, an index (an hour marker, a numeral marker, or any marker), a bezel disk or, more generally, a decorative plate. The invention also relates to a timepiece, such as a watch, comprising such a versatile horology component.

BACKGROUND ART

There are, in existence, horology components the aesthetic of which changes according to the luminosity in order to create decorative effects, particularly dials. Such horology components traditionally comprise coats of luminescent varnish. These existing horology components all exhibit disadvantages, including:

a complex architecture, leading to a manufacturing process that is complex, handling that is tricky, use that is limited and/or an overall cost that is high; and/or limited rendition from an aesthetic standpoint.

It is an overall objective of the invention to offer a versatile horology component solution which does not have all or some of the disadvantages of the prior art, and which forms a solution that is an improvement on the existing solutions.

More particularly, one object of the invention is to offer a versatile horology component solution that is simple and makes it possible to achieve an attractive aesthetic effect.

BRIEF DESCRIPTION OF THE INVENTION

To that end, the invention relates to a horology component for a timepiece, which component characteristically comprises a first portion and a second portion, the first portion comprising at least one part made from at least one opaque material that is at least partially superposed on top of the second portion, this second portion comprising a material capable of emitting at least one emission light wave if excited by at least one excitation light wave, and said at least one part of the first portion comprising structuration allowing an emission light wave emitted by the second portion to be transmitted at least partially toward the outside of the horology component so that the horology component exhibits at least a first appearance by day and at least one different second appearance by night where the first portion is backlit by an emission light wave emitted by the second portion.

Such a horology component may be a dial, a dial counter, an index (an hour marker, a numeral marker, or any marker), a bezel disk or a decorative plate.

The invention also relates to a timepiece, notably a wristwatch, per se, which comprises such a horology component.

The invention is more specifically defined by the claims.

BRIEF DESCRIPTION OF THE FIGURES

These objectives, features and advantages of the invention will be described in detail in the following description of particular nonlimiting embodiments given with reference to the appended figures, in which:

FIG. 1 depicts a schematic view in cross section of a versatile horology component according to a first alternative form of a first embodiment of the invention.

FIG. 2 depicts a schematic view in cross section of a versatile horology component according to another first alternative form of the first embodiment of the invention.

FIGS. 3 and 4 depict a schematic view in cross section of a versatile horology component according to still further first alternative forms of the first embodiment of the invention.

FIG. 5 depicts a schematic view in cross section of a versatile horology component according to a second alternative form of the first embodiment of the invention.

FIG. 6 depicts a schematic view in cross section of a versatile horology component according to a particular first alternative form of a second embodiment of the invention.

FIG. 7 depicts an enlarged view of details of FIG. 6.

DETAILED DESCRIPTION OF PARTICULAR EMBODIMENTS

Figures 4, 5, 6, 7:
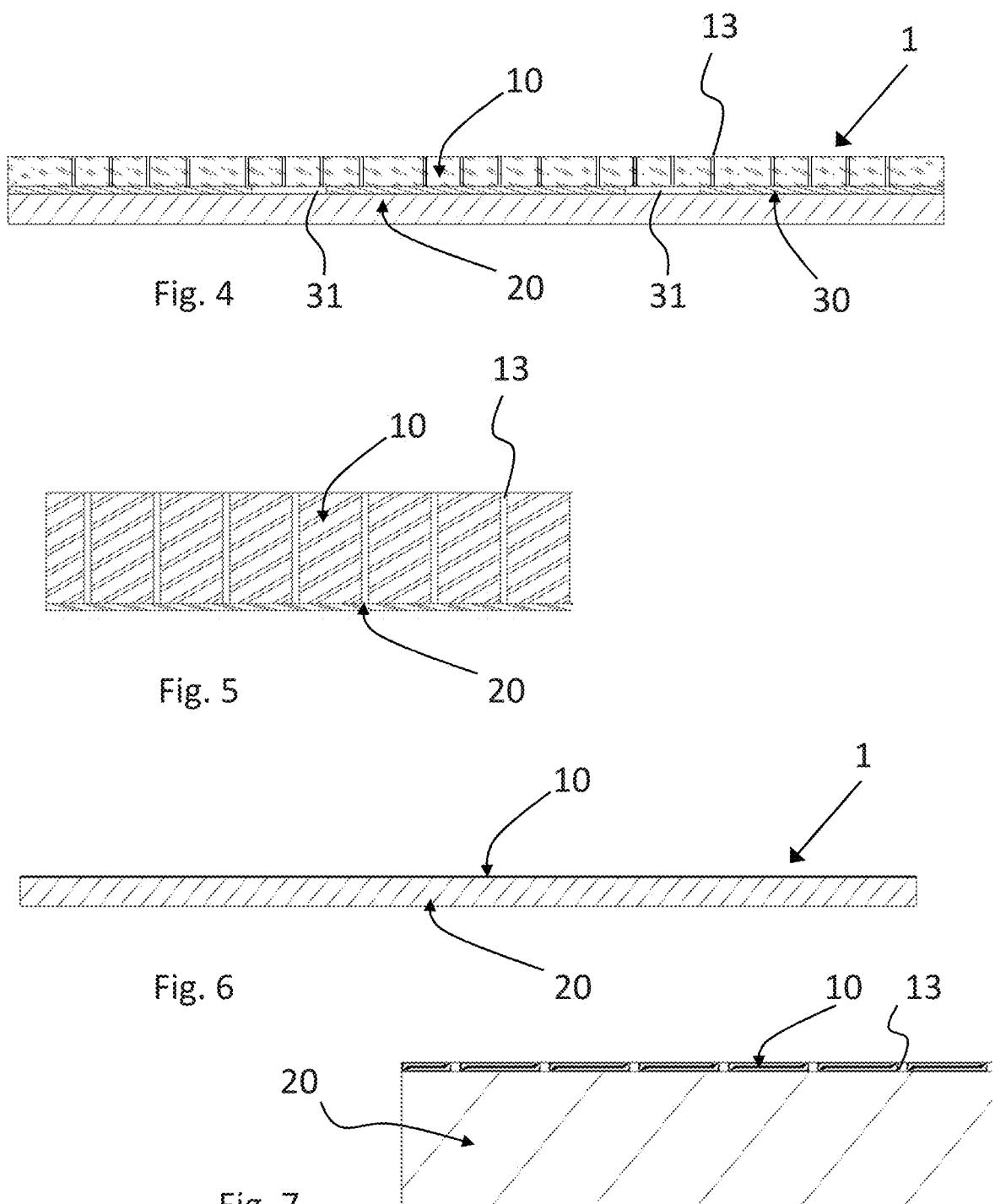

For the sake of the flow of the description, the same references will be used in the various embodiments for denoting features that are identical or equivalent.

In addition, in order to simplify the description that follows, the adjective "exterior" will be used to refer to a volume or a surface of a horology component that is intended to face toward the outside of a timepiece, notably including a volume or a surface directly visible to an observer looking at the timepiece. By contrast, the adjective "interior" refers to a volume or a surface of a horology component that is intended to face toward the inside of a timepiece with respect to another volume or surface of the same horology component that faces toward the outside.

Furthermore, the adjective "opaque" will be used to refer to the property of a material when the material in question has a transmission of under 10% of light radiation containing, in practice, at least wavelengths in the visible and/or ultraviolet part of the spectrum. An "opaque material" will be considered to mean a material of which the nature, combined with the thickness used, forms an opaque barrier to the above-mentioned light radiation. In the embodiments of the invention, the material of a first portion will be opaque with reference to the wavelengths of light that excite another material of a second portion and/or to the wavelengths of a wave of light emitted by such another excited material, as will be explained in detail hereinafter. Note: the one same material may be opaque when used at a certain thickness, and non-opaque at a lesser thickness. The same term "opaque materials" will be used in the plural for a structure comprising an arrangement of several materials the combination of which meets the conditions explained hereinabove in respect of the definition of an "opaque material". The term "opaque zone" or "opaque part" will be used to refer to a localized part of a component formed of at least one opaque material and which behaves in the way mentioned herein-above with respect to a radiation, and ultimately prevents any visible effect of a wave of light through said opaque zone or part.

The adjective "transparent" will be used to refer to a material or part of a component which is not opaque, thus covering embodiments that are fully transparent and par-tially transparent, such as semi-transparent or translucent. The adjective "transparent" will be used to refer to the property of a material when the material in question has a transmission of more than 10% inclusive, of light radiation containing, in practice, at least wavelengths in the visible and/or ultraviolet part of the spectrum. A "transparent mate-rial" will be considered to mean a material of which the nature, combined with the thickness used, allows at least partial transmission of the above-mentioned light radiation. In the embodiments of the invention, the material of all or part of a first portion will be transparent with reference to the wavelengths of light that excite another material of a second portion and/or to the wavelengths of a wave of light emitted by such another excited material, as will be explained in detail hereinafter. Note: the one same material may be transparent when used at a certain thickness, and non-transparent at a greater thickness. The same term "transpar-ent materials" will be used in the plural for a structure comprising an arrangement of several materials the combi-nation of which meets the conditions explained hereinabove in respect of the definition of a "transparent material". The term "transparent zone" or "transparent part" will be used to refer to a localized part of a component formed of at least one transparent material and which behaves in the way mentioned hereinabove with respect to a radiation, and ultimately allows any visible effect of a wave of light through said transparent zone or part. Such a transparent part may be obtained by using at least one transparent material, or by using at least one transparent material advantageously combined with a special structuration, as will be described in detail later on.

The embodiments of the invention are all based on the use of a portion within a horology component capable of emit-ting light when it is or has been subjected to illumination, notably to external illumination or illumination from any appropriate excitation source, in a certain range of wave-lengths, because the portion is made up of a material that is notably phosphorescent and/or fluorescent. Thus, the term "excitation light wave" will be used for illumination in a range of wavelengths that allows excitation of this portion able in return to emit light or lighting: in practice, this range of wavelengths represents all or part of the wavelengths corresponding to the ultraviolet and visible parts of the spectrum. Finally, the term "emission light wave" will be used to refer to any illumination or emission spectrum that produces an effect, visible to an observer looking at the horology component concerned, particularly at night time or under conditions of reduced light intensity, emitted by said portion following its having received an excitation light wave. Note: for the sake of simplicity, the two opposing situations will be referred to hereinafter as day/night, although the term "night" is not restricted to a situation of total darkness but extends to include periods of partial darkness somewhere between day and night.

Note: an excitation light wave may come from outside and reach the second portion after having passed through the first portion. As an alternative, an excitation light wave may be generated by any other means, notably by an internal light source. By way of example, it could be generated by a light source comprising LEDs, positioned inside a timepiece, under the second portion.

A number of embodiments of the invention will now be described in the context of a horology component intended for a timepiece.

Such a horology component 1 may, for example, be a dial for a timepiece, notably for a wristwatch. It comprises a first portion 10 made from at least one opaque material, and a second portion 20 made from at least one material able to emit an emission light wave, notably by phosphorescence and/or fluorescence, when it is or has been subjected to an excitation light wave within a certain range of frequencies.

The first portion 10 comprises at least one structuration 13 able to render said first portion at least partially transparent, so that the second portion 20 can be subjected to illumina-tion, notably to external illumination, and so that the light emitted by the second portion 20 can generate a visual effect visible to an observer looking at the horology component. In other words, the first portion comprises at least one opaque material, which without the structuration would render it opaque.

A "structuration" may be any opening formed on the surface or within the thickness of the first portion. Thus, the term opening 13 may be used to refer to a structuration 13. Such an opening may be blind or open-ended or pass all the way through or represent an internal porosity, within the thickness of the first portion. Such an opening may be a micro-opening or a nano-opening, preferably sufficiently small in size as to be invisible or virtually invisible to the naked eye by day. Alternatively, such an opening may have a larger, macroscopic, dimension, so as to render it inten-tionally visible. It then also contributes to the decorative effect by day. Alternatively, such a blind opening may be produced on the non-visible face, so as to render it inten-tionally invisible. It then does not contribute to the decora-tive effect by day. In all cases, the openings, whether or not they pass all the way through, may have any cross section, not necessarily circular. This cross section may effectively be rectangular or star-shaped for example, or may have any other suitable geometry.

Alternatively, a structuration may be an at least local modification to the transparency properties of the material of which the first portion is made in all or part of the thickness of said first portion.

Such structuration may notably be obtained using any conventional machining technique, or by laser machining, notably by femtosecond laser machining or by deep reactive ion etching (DRIE), or else by chemical attack.

A first embodiment of the invention will now be described in the context of a horology component intended for a timepiece.

According to the first embodiment, the first portion 10 takes the form of a massive portion. It comprises an exterior surface 11 intended to face toward the outside of a wrist-watch and visible or partially visible to the observer. It additionally comprises an opposite, parallel or substantially parallel, interior surface 12 invisible to the observer. It may have a thickness less than or equal to 2 mm inclusive, or even a thickness comprised between 0.05 mm and 2 mm inclusive. A portion is notably considered to be massive when, considered independently of the other portions, it constitutes a solid object which has no structural need for mechanical support in order to support it without deforma-tion.

It may be formed of one or more material(s) selected from the following nonexhaustive list: some mother-of-pearls, particularly black; some fossil materials; tortoiseshell; manganocalcite; lepidolite; petrified wood; coral; amber; pearl; ivory; metal or metal alloy such as platinum or ferrite or meteorite; engineering ceramic based on zirconia and/or alumina, pigmented or otherwise; gemstone; mineral; stone or precious substance of organic origin; sphalerite; fluorite; agate; alexandrite; amethyst; anatase; aventurine quartz; calcedony; chrysoberyl; chrysoprase; citrine; jasper; tiger's eye; opal; quartz; spinel; aragonite; azurite; malachite; crocoite; apatite; lazulite; turquoise; aquamarine; beryl; tourmaline; obsidian; or snowflake obsidian.

According to a first alternative form of the first embodiment, the second portion 20 takes the form of a massive portion. A second portion such as this thus advantageously comprises a massive structure incorporating a luminescent material distributed through its volume. The advantages of such a second portion are that it incorporates a large quantity of luminescent material, allowing it to release more light, and that it has enough rigidity to give it a mechanical property that allows it to be used as a mechanical support in the construction. Such a second portion may have a substantially constant thickness, on average comprised between 0.01 mm and 5 mm. Such a second portion may have a surface area greater than or equal to 1 mm$^2$ or a surface area comprised between 0.01 cm$^2$ and 15 cm$^2$ inclusive. Such a second portion may be a plate made of fluorescent and/or phosphorescent ceramic, notably a composite ceramic based on yttrium-stabilized zirconium and Dy/Eu-doped strontium aluminate, advantageously made of "luminescent zirconium", for example as described in document EP2730636.

The advantage of such a second portion is that it has enough rigidity to give it a mechanical property that allows it to be used as a mechanical support in the construction. Thus, the second portion may form a mechanical support for the first portion and/or a support allowing the horology component to be mounted within a timepiece. Finally, the second portion may perform the dual role of illuminating by night, namely in that it can produce an emission light wave, and of supporting the first portion of the horology component. Through this mechanical property, it is possible to form a horology component comprised of only the two assembled portions. The horology component is thus simplified to the maximum.

Thus, according to the first alternative form of the first embodiment, the two portions 10 and 20 of the horology component take the form of two distinct massive or solid elements assembled with one another. FIG. 1 illustrates, for example, one particular way of executing such a horology component equipped only with two massive or solid portions assembled with one another, for example by bonding.

More particularly, this horology component is equipped with a first portion 10 comprising a structuration 13 in the form of several through-openings. The purpose of these through-openings is to render the first portion at least partially transparent. In order to do that, the first portion may comprise a sufficient number of openings to obtain a visible backlighting effect provided by the luminescent material present in the second portion: these through-openings are therefore sufficient to, on the one hand, allow the transmission of excitation light waves coming from outside to the second portion and, on the other hand, transmit light waves emitted by the second portion following excitation thereof. More specifically, the first portion thus becomes at least partially transparent to the wavelengths that allow excitation and emission for the luminescent material present in the second portion, which means that at least certain of the wavelengths in the range that permits excitation of the luminescent material specifically used pass through the first portion with sufficient efficiency for the luminescent material to reach the required level of excitation and that at least certain of the wavelengths in the emission range of this same luminescent material in return pass through the first portion with sufficient efficiency to reach a required emission level, notably to obtain a visual effect in the night-time.

The openings 13 in the first portion are, in this instance, micro-openings that pass all the way through or nano-openings that pass all the way through, preferably sufficiently small in size that they cannot be identified by the naked eye. By way of example, these openings may take a substantially cylindrical form with a diameter less than or equal to 60 μm, because it is commonly accepted that from a distance of 20 cm, the naked eye can perceive details of a size larger than this. In other words, in order for these through-openings not to be visible by day, their dimensions are preferably smaller than the maximum resolving power of the eye under the normal conditions in which a watch is consulted. The resolving power of the eye is approximately one minute of arc length. Finally, through these two properties of the micro-openings in the embodiment, the first portion, although made of an opaque material, allows the second portion 20 to be subjected to illumination, notably to external illumination, and allows the light emitted by the second portion 20 to generate a visual effect visible to an observer looking at the horology component.

Naturally, the quantity of openings 13, their respective dimensions and their distribution, represent a compromise reached on the basis of a desired aesthetic result. Specifically, the shaping, arrangement and density of the structuration are dependent on the desired effect in terms of a pattern obtained and/or a level of afterglow according to where it is a fleeting decorative effect or a display lasting several hours that is being sought. This compromise is also dependent on the luminescent material chosen for the second portion. There is therefore a very high number of possibilities. However, it should be noted that micro-openings equivalent to open-ended cylinders or cylinders that pass all the way through with a diameter less than or equal to 100 microns, or even less than or equal to 60 microns, and greater than or equal to a value of the order of 250 nm, the lower size of the openings being that that physically allows the passage of the excitation and/or emission waves, allow the desired objective to be achieved satisfactorily. Of course, the openings may have any geometry suited to the passage of the excitation and/or emission waves.

Of course, it is possible to obtain equivalent, additional or alternative visual effects using at least one blind opening, which is deep enough to allow the passage of the excitation and emission light waves through the residual material. This at least one opening may be formed beginning from the exterior surface, or beginning from the interior surface of the first portion. It may have flanks that are straight or inclined. Optionally, this opening may comprise optical means, such as optical fibres, or may be filled with any at least partially transparent material.

In addition or alternatively, the first portion may comprise a structuration that at least locally modifies the transparency properties of the material of which said first portion is made. In other words, various structuration may be combined to create the desired visual effects. For example, FIG. 2 illustrates one particular way of executing a component according to a first alternative form of the first embodiment, which is equipped with a first portion comprising both through-openings 13 and a blind opening 15.

Furthermore, the structuration may be homogeneous; in particular, all the openings may be identical and uniformly distributed over the entire surface of the first portion, in order to form a homogeneous effect. Alternatively, their distribution and/or their geometry may differ within the first portion, to form a heterogeneous effect, which will give a different visual effect. For example, the horology component may comprise blind openings of variable depth, which may evolve according to a gradient. That makes it possible to see a variation in brightness that varies progressively according to the zones of the horology component.

Alternatively, the distribution of the openings is not uniform, as in the particular execution depicted in FIG. 1, but these openings are positioned in such a way as to form a design, which will be perceptible at night, revealed by the backlighting by the luminescent second portion. In that case, the openings perform the dual role of rendering the first portion at least partially transparent while at the same time forming an aesthetic design, namely a decoration that is visible by night. According to one advantageous embodiment, this design may, for example, be a pattern, providing not only a decoration but also an indication or information of some kind visible by night.

In this particular construction depicted in FIG. 1, the first portion 10 defines the daytime aesthetic of the horology component. In this case, the observer cannot see through the first portion. By day, he sees the horology component only as if it comprised only this first portion without opening. The horology component thus obtained is therefore a versatile horology component because it has at least a first appearance by day, in which the appearance of the component corresponds substantially to the appearance of the first portion, and at least one second appearance by night where the first portion is backlit by a visible emission light wave emitted by the second portion. There is thus a level of darkness, notably of partial darkness, beyond which the difference between the at least first appearance and the at least second appearance becomes visible. Furthermore, the backlighting may vary according to the intensity of the emission light wave emitted by the second portion, which diminishes over the course of time. Thus, the night-time appearance of the component may evolve.

In the alternative scenario in which all or some of the openings are visible by day, these openings contribute to the daytime aesthetic of the horology component. Furthermore, the night-time aesthetic of the horology component is that of the first portion backlit by the light emitted by the second portion. The horology component thus obtained is therefore a versatile horology component because it has at least one first appearance by day and at least one second appearance by night, the at least first and second appearances being different.

In the first alternative form of the first embodiment, the two portions of the horology component therefore take the form of two distinct solid elements assembled with one another. The assembly of the two portions of the horology component may, for example, be achieved by bonding. Alternatively, the assembly of the two portions of the horology component may be achieved by capillary adhesion. This assembly thus advantageously allows the two portions to be fixed together in a more or less removable manner. Alternatively also, the two portions may be assembled by riveting, setting or driving of ancillary mechanical means. For example, the two portions may be brought into contact and held together by mechanical strapping.

In one particular execution of a horology component according to the first alternative form of the first embodiment, a third portion may be provided for modifying, or even sublimating, the visual effects generated by the second portion of said horology component, and therefore modifying the daytime and/or night-time aesthetic of the horology component. This third portion may be interposed between the first and the second portion. This third portion may, for example, take the form of a mask, which limits the transmission of light whatever the structuration of the first portion situated above it. This third portion may also take the form of a layer, for example the form of a fluorescent layer, which can be excited by the second portion. Advantageously, such a third portion may be intended to contribute to the function of assembling the first and second portions of said horology component.

FIG. 3 illustrates one way of executing such a horology component. The third portion 30 is interposed between the two first portions, at the circumference thereof, so as to form a skirt comprising an inward extension 32 intended for the fixing of the horology component. In the central part, the two portions 10, 20 are superposed but not in contact, being separated by a space 5 corresponding to the thickness of the third portion 30. Thus, advantageously, this third portion makes it possible to modify the daytime and/or night-time aesthetic of the horology component by keeping the first and second portions some distance apart.

FIG. 4 illustrates another way of executing such a horology component, in which a third portion 30 takes the form of a decorative mask incorporated between the two portions 10, 20 of the horology component. This mask may be opaque and have openings 31 allowing the excitation and emission light waves to pass, these openings 31 possibly forming a decorative design. Thus, advantageously, this third portion makes it possible to modify the daytime and/or night-time aesthetic of the horology component. Advantageously also, this third portion may comprise optical means for modifying the backlighting from the second portion, such as optical fibres for example. Alternatively, this third portion may take the form of a layer, notably a semi-transparent layer, for example the form of a semi-transparent fluorescent layer, which can be excited by the second portion.

In a second alternative form of the first embodiment, the second portion 20 does not take the form of a massive component and/or does not perform the mechanical support function described above. It could take any other form that allows it to perform its illuminating function, based on any luminescent, phosphorescent and/or fluorescent or other material. For example, it may take the form of a varnish applied underneath the first portion 10, i.e. on the interior face 12 of the first portion 10. FIG. 5 illustrates, for example, such a way of executing a horology component.

Alternatively or in addition, it may take the form of a varnish applied to openings formed in the interior surface 12 of the first portion.

Thus, the horology component may take the form of a one-piece horology component, rather than of two distinct elements, which have been assembled in a more or less removable manner.

As a further alternative, the second portion may take the form of a varnish applied to an element distinct from the first portion and positioned under this first portion. This distinct element may for example be a support portion in the form of a massive element advantageously having enough rigidity to give it a mechanical property that allows it to be used as a mechanical support in the construction.

Thus, the support portion may form a mechanical support for the first and second portions and/or a support allowing the horology component to be mounted within a timepiece.

In one particular execution of a horology component according to the second alternative form of the first embodiment, a third portion may be provided for modifying, or even sublimating, the effects generated by the second portion of said horology component, and therefore modifying the daytime and/or night-time aesthetic of the horology component. This third portion may be interposed between the first and the second portion. This third portion may, for example, take the form of a mask which limits the transmission of light whatever the structuration of the first portion situated above it. This third portion may equally take the form of a layer, notably a semi-transparent layer, for example the form of a semi-transparent fluorescent layer, which can be excited by the second portion. Advantageously, such a third portion may be intended for assembling the first and second portions of said horology component.

According to a second embodiment, the first portion 10 takes the form of a coating applied to the second portion 20. The thickness of this coating is such that the material(s) of which it is made is (are) opaque. The structuration 13 consists, for example, of micro-openings or nano-openings made in this coating, as explained hereinabove. The coating may be made up of metals, metal alloys, polymers, lacquers, varnishes, enamels, ceramics, vitreous ceramics, or hybrid materials. The coating may be applied by any means, such as physically by physical vapor deposition (PVD), chemically by chemical vapor deposition (CVD), by atomic layer deposition (ALD), by spraying (that allows a liquid to be vaporized into fine droplets under the effect of air pressure), using a sol-gel process, etc. Any other procedure known to those skilled in the art for applying a coating may be envisioned.

According to a first alternative form of the second embodiment, the second portion 20 takes the form of a massive portion. A second portion such as this thus advantageously comprises a massive structure incorporating a luminescent material distributed throughout its entire volume. A second portion such as this may have a substantially constant thickness, on average comprised between 0.01 mm and 5 mm. A second portion such as this may be a plate made from a luminescent ceramic, advantageously luminescent zirconia.

The advantage of such a second portion is that it has enough rigidity to give it a mechanical property that allows it to be used as a mechanical support in the construction. Thus, the second portion may form a mechanical support for the first portion and/or a support allowing the horology component to be mounted within a timepiece. Finally, the second portion may perform the dual role of illuminating by night, namely in that it can produce an emission light wave, and of supporting the first portion of the horology component. Through this mechanical property, it is possible to form a horology component comprised of only the two portions. The horology component is thus simplified to the maximum.

Thus, according to the first alternative form of the second embodiment, the first portion takes the form of a coating applied to the exterior surface of the second portion. Thus, the horology component according to the first alternative form of the second embodiment takes the form of a one-piece horology component, rather than of two distinct elements which have been assembled, in a more or less removable manner.

FIG. 6 depicts one particular way of executing a horology component according to the first alternative form of the second embodiment. As described previously, a structuration 13 based on micro-openings, which are depicted in the enlargement of FIG. 7, is produced in this coating.

Figure 8A:
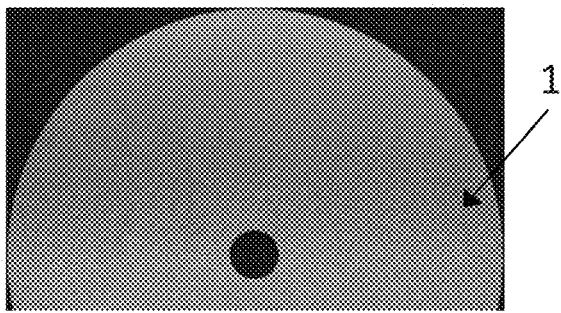
FIGS. 8a and 8b depict the appearances, by day and by night respectively, of a versatile horology component according to a particular first alternative form of the second embodiment of the invention.
Figure 8B:
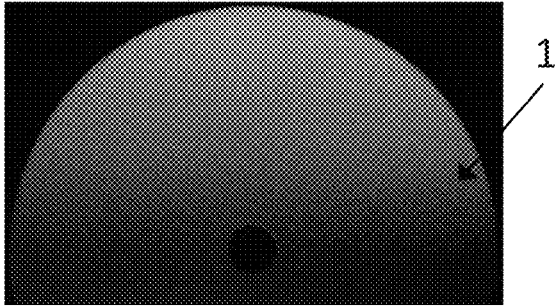

FIGS. 8a and 8b depicts one particular way of executing a horology component according to the first alternative form of the second embodiment, comprising a first portion 10 formed by grey shading on a 100 nm thick opaque layer of titanium, forming a coating on a second portion 20 made of massive luminescent zirconia. The layer of titanium is perforated, notably using a femtosecond laser, with progressively increasing degrees of perforation, in order to create grey shading, that the observer is able to perceive by day. More particularly, the layer of titanium comprises micro-openings, the density of which varies locally. FIG. 8a depicts the horology component by day, which has a shaded metallic grey appearance, and FIG. 8b depicts this same horology component by night, where it has a luminous appearance the intensity of which varies according to the aforementioned shading. Alternatively, the layer of titanium may be thinned using a femtosecond laser, with progressively increasing levels of ablation. That creates grey shading, that the observer may or may not be able to perceive by day, affording aesthetic effects such as those depicted in FIGS. 8a and 8b. What is meant here by "ablation" is an at least local thinning of the coating that forms the first portion 10.

Figure 9:
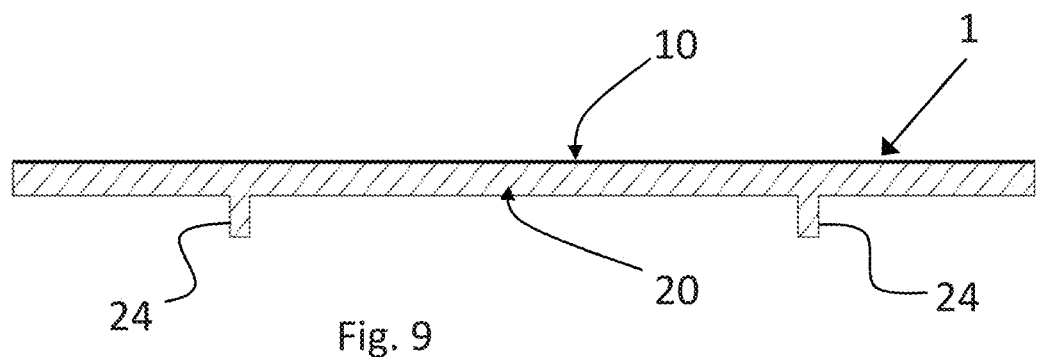
FIGS. 9 to 11 depict a schematic view in cross section of a versatile horology component according to still further first alternative forms of the second embodiment of the invention.

FIG. 9 depicts another particular way of executing a horology component according to the first alternative form of the second embodiment, in which the second portion 20 has interior extensions 24 for promoting its fixation.

Figure 10:
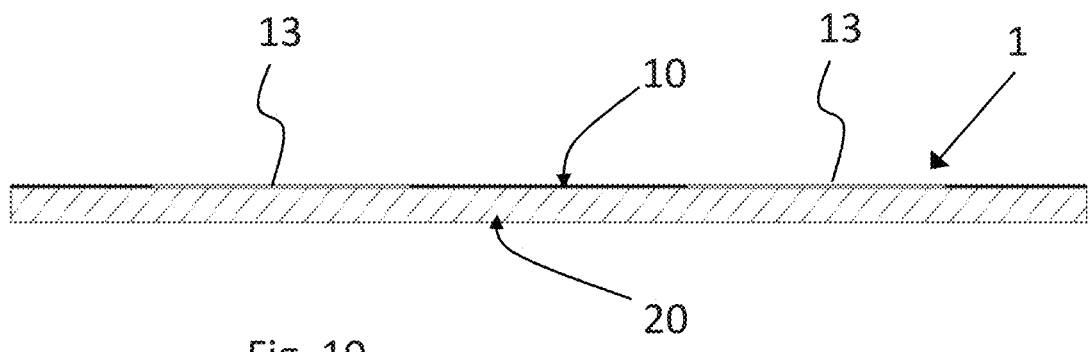

FIG. 10 depicts another particular way of executing a horology component according to the first alternative form of the second embodiment, in which a first portion 10 takes the form of an opaque platinum coating on a massive second portion 20 incorporating luminescent material, such as luminescent zirconia. The first portion comprises micro-openings, not depicted, and macroscopic openings 13 that form a decoration visible by day. All or some of the macroscopic openings may optionally be filled with at least one second coating which may constitute a decoration or inscriptions.

Such openings may be achieved by localized deposition, or using masking, when depositing the coating.

Figure 11:
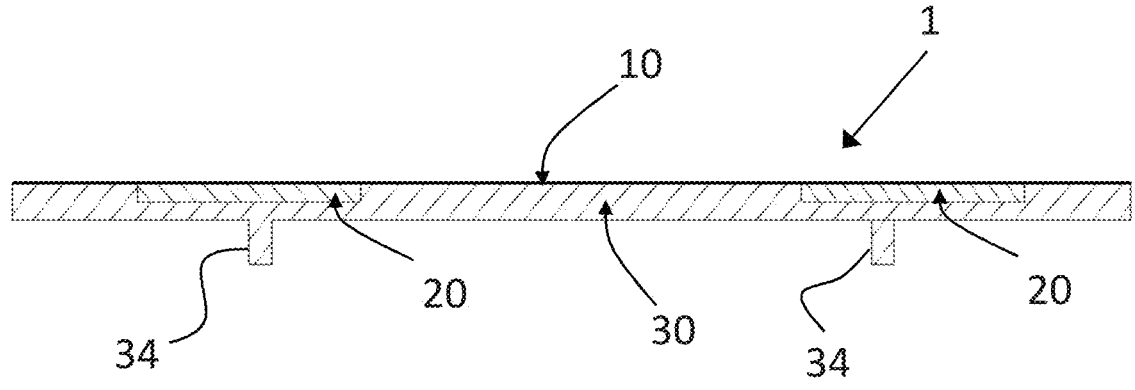

FIG. 11 depicts another particular way of executing a horology component according to the first alternative form of the second embodiment. This horology component incorporates a third portion 30 in the form of a massive component acting as a base plate for the horology component and incorporating, for example, legs 34 for fixing to a timepiece, such as to a horology movement. A second portion 20 comprises several distinct massive parts, incorporating, distributed through their volume, luminescent material, such as luminescent zirconia, included in the hollows in the exterior surface of the third portion 30. The exterior surfaces of the second and third portions are substantially at the same level and are coated with a first portion 10, such as a coating. The second portion 20 may constitute added numerals or hour markers. As an alternative, these added numerals and hour markers may be in relief rather than being in the same plane as the third portion 30. Such numerals and hour markers may for example be added to a dial plate, which constitutes the third portion 30. Thus, advantageously, this third portion may act as a support and/or make it possible to modify the daytime and/or night-time aesthetic of the horology component.

Whatever the execution, a third portion may be interposed between the first and the second portion. This third portion may, for example, take the form of a mask, which limits the transmission of light whatever the structuration of the first portion situated above it. Alternatively or in addition, this third portion may equally take the form of a layer, notably a semi-transparent layer, for example the form of a semi-transparent fluorescent layer, which can be excited by the second portion.

In a second alternative form of the second embodiment, the second portion does not take the form of a massive component and/or does not perform the mechanical support function described above. It could take any other form that allows it to perform its illuminating function, based on any luminescent, phosphorescent or other material. For example, it may be in the form of a varnish applied to a distinct element such as a support portion taking the form of a massive element advantageously having enough rigidity to give it a mechanical property that allows it to be used as a mechanical support in the construction. Thus, the support portion may form a mechanical support for the second portion and/or for the horology component.

Figure 12:
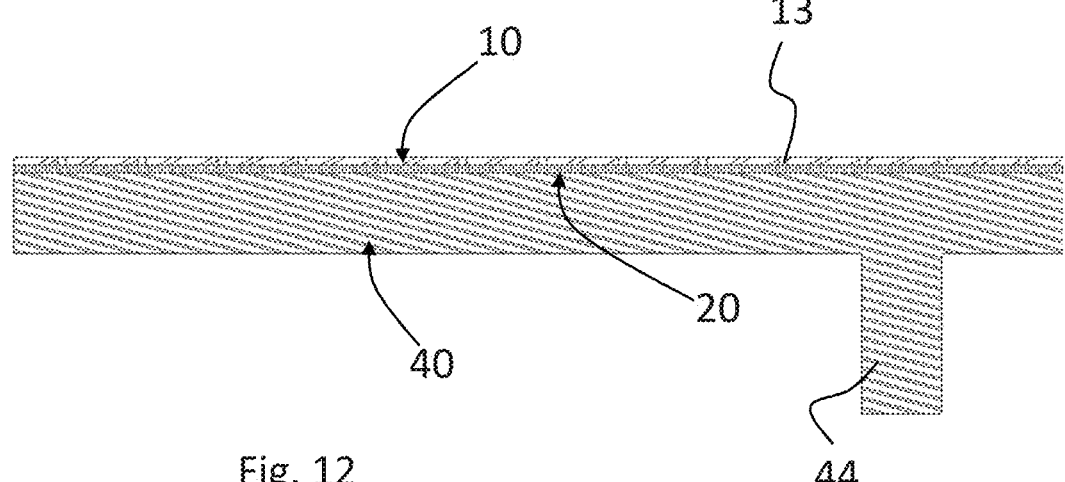
FIG. 12 depicts a schematic view in cross section of a versatile horology component according to a second particular alternative form of the second embodiment of the invention.

FIG. 12 illustrates such an execution in which a support portion 40 is coated on its exterior surface with a second portion 20, onto which a first portion 10 is coated. This support portion 40 takes the form of a massive component acting as a base plate for the horology component and incorporates, for example, legs 44 for fixing to a timepiece, such as to a horology movement.

Thus, according to the second alternative form of the second embodiment, the first portion takes the form of a coating applied to the second portion supported by the support portion. Thus, the horology component according to the second alternative form of the second embodiment takes the form of a support portion coated twice with first and second portions that are at least partially superposed.

Whatever the embodiment considered, the horology component may be a dial, a dial counter, an hour marker, a numeral marker, a bezel disk or, more generally, a decorative plate. In the latter instance, the decorative plate may be assembled with any other horology component in order to decorate same; it may thus supplement a dial of substantially traditional structure rather than on its own forming the dial, as in the particular forms of execution which have been described. Thus, more generally, the invention applies to any object the cladding or decorating of which implements the solution described. The invention also relates to a timepiece, notably a wristwatch, incorporating a versatile horology component according to one embodiment of the invention.

The horology component has been described nonlimitingly hereinabove. Numerous other executions are conceivable.

Whatever the embodiment considered, other additional elements, such as numerals and hour markers or transfers, may be superposed on the first portion, concealing certain zones. Depending on the nature of these additional elements, the luminescence effect may be maintained or eliminated.

It is of course possible to combine the alternative forms of embodiment or the executions described hereinabove. Furthermore, the two portions 10, 20 of the horology component can be superposed only partially. They may occupy any geometry, for example form the entirety of a dial or just a sub-part of a dial, such as numerals and hour markers or counters. In addition, the first portion may comprise one or more zone(s) made of an opaque material, as described previously, combined with one or more zone(s) made of transparent material(s), for which performing a structuration is not obligatory, but conceivable in order optionally to modify the transparency property of such a zone. The first portion may have a small thickness, less than or equal to 2 mm inclusive, or even a thickness comprised between 5 nm and 2 mm inclusive, or even between 5 nm and 1 mm inclusive, or even between 5 nm and 0.8 mm inclusive.

The invention claimed is:

1. A horology component for a timepiece, wherein the component consists of:
   a first portion,
   a second portion, and
   optionally a third portion arranged on top of or substantially even with the second portion or interposed between the first and second portion,
   the first portion comprising a part made from at least one opaque material at least partially superposed on top of the second portion,
   the second portion comprising a material capable of emitting at least one emission light wave if excited by at least one excitation light wave,
   the part of the first portion comprising a structuration allowing an emission light wave emitted by the second portion to be transmitted at least partially toward the outside of the horology component so that the horology component exhibits at least a first appearance by day and at least one different second appearance by night where the first portion is backlit by an emission light wave emitted by the second portion,
   wherein the structuration of the part of the first portion comprises openings with a diameter less than or equal to 60 μm and greater than or equal to 250 nm, and
   each opening is an open-ended substantially diametrically uniform cylinder or a substantially diametrically uniform cylinder that passes all the way through the first portion and has a constant depth.

2. The horology component as claimed in claim 1, wherein the structuring of the part of the first portion allows an excitation light wave coming from outside the horology component to be transmitted at least in part to the second portion.

3. The horology component as claimed in claim 1, wherein the part of the first portion is formed in at least one material opaque to an excitation light wave exciting the second portion and/or to an emission light wave emitted by the second portion.

4. The horology component as claimed in claim 1, wherein the structuration of the part of the first portion comprises at least one selected from the group consisting of openings formed on an exterior surface, openings formed on an interior surface, openings formed in the thickness of the part of the first portion, and an ablation of the part of the first portion.

5. The horology component as claimed in claim 1, wherein the part of the first portion comprises structuring employing at least local modification to the transparency properties of a material of which the first portion is made.

6. The horology component as claimed in claim 1, wherein the part of the first portion comprises structuring invisible or barely visible to the naked eye by day.

7. The horology component as claimed in claim 1, wherein the part of the first portion comprises structuring distributed homogeneously.

8. The horology component as claimed in claim 1, wherein the first portion comprises at least one other part made of a homogeneous or heterogeneous at least partially transparent material, juxtaposed with at least one part comprising at least one opaque material comprising structuring.

9. The horology component as claimed in claim 1, wherein the second portion is in the form of a massive structure formed from a material having a phosphorescent and/or fluorescent property.

10. The horology component as claimed in claim 9, wherein the second portion is in the form of a fluorescent and/or phosphorescent ceramic.

11. The horology component as claimed in claim 1, wherein the second portion forms a support for the first portion, and/or wherein the second portion comprises a fixing device for fixing the horology component on a timepiece.

12. The horology component as claimed in claim 1, wherein the second portion is in the form of a varnish comprising a fluorescent and/or phosphorescent property applied to at least one selected from the group consisting of an interior surface of the first portion, a hollow of the interior surface of the first portion, and a surface of another portion positioned facing the interior surface of the first portion.

13. The horology component as claimed in claim 1, wherein the first portion is in the form of a massive structure, or wherein the first portion is in the form of a coating of the second portion.

14. The horology component as claimed in claim 1, wherein the first portion is made of mother-of-pearl; of fossil material; of tortoiseshell; of manganocalcite; of lepidolite; of petrified wood; of coral; of amber; of pearl; of ivory; of metal or of metal alloy; of engineering ceramic based on zirconia and/or alumina, pigmented or otherwise; of gemstone; of mineral; of stone or precious substance of organic origin; of sphalerite; of fluorite; of agate; of alexandrite; of amethyst; of anatase; of aventurine quartz; of calcedony; of chrysoberyl; of chrysoprase; of citrine; of jasper; of tiger's eye; of opal; of quartz; of spinel; of aragonite; of azurite; of malachite; of crocoite; of apatite; of lazulite; of turquoise; of aquamarine; of beryl; of tourmaline; of obsidian; or of snowflake obsidian.

15. The horology component as claimed in claim 1, wherein the component comprises a removable or non-removable assembly between the first and second portions by bonding, or by a mechanical device, or by capillary adhesion, or wherein the first portion is a surface coating of the second portion, or wherein the second portion is a varnish applied under the first portion on an interior surface of the first portion or in a hollow of the interior surface of the first portion or on a surface of another portion, or wherein the second portion is a varnish applied on another portion and the first portion is a coating applied to the varnish forming the second portion.

16. The horology component as claimed in claim 1, wherein the first portion has an average thickness less than or equal to 2 mm inclusive, and/or wherein the second portion has a thickness greater than or equal to 0.01 mm, and/or wherein the second portion has a surface area greater than or equal to 1 mm$^2$.

17. The horology component as claimed in claim 1, wherein the component consists of the first portion, the second portion, and the third portion.

18. The horology component as claimed in claim 17, wherein the third portion is a mask, selective or otherwise, and/or wherein the third portion comprises a fixing device for fixing the horology component, and/or wherein the third portion supports several distinct parts of the second portion, and/or wherein the third portion contributes to the function of assembling the first and second portions, and/or wherein the third portion comprises optical elements.

19. The horology component as claimed in claim 1, wherein the component is a dial, a dial counter, an hour marker, a numeral marker, a bezel disk, or a decorative plate.

20. A timepiece, wherein the timepiece comprises a horology component as claimed in claim 1.

* * * * *